United States Patent [19]

Oka et al.

[11] Patent Number: 5,557,716
[45] Date of Patent: Sep. 17, 1996

[54] GRAPH DRAWING

[75] Inventors: Hirotsugu Oka, Tokyo; Hiroyuki Watabe, Yokohama, both of Japan

[73] Assignee: Canon Kabushiki Kaisha, Tokyo, Japan

[21] Appl. No.: 84,126

[22] Filed: Jul. 1, 1993

[30] Foreign Application Priority Data

| Jul. 2, 1992 | [JP] | Japan | 4-175557 |
| Jul. 2, 1992 | [JP] | Japan | 4-175560 |
| Jul. 2, 1992 | [JP] | Japan | 4-175561 |
| Jul. 2, 1992 | [JP] | Japan | 40175556 |
| Jul. 6, 1992 | [JP] | Japan | 4-178530 |

[51] Int. Cl.$^6$ .................................. G06T 11/00
[52] U.S. Cl. ................. 395/140; 395/147; 395/155; 395/161
[58] Field of Search .................. 395/140, 145, 395/147–149, 155, 161, 162; 324/77

[56] References Cited

U.S. PATENT DOCUMENTS

| 4,674,042 | 6/1987 | Hernandez et al. | 395/140 |
| 4,897,800 | 1/1990 | Nakanishi et al. | 395/140 |
| 5,138,252 | 8/1992 | Ferguson | 324/77 |
| 5,230,040 | 7/1993 | Yamashita | 395/148 |

*Primary Examiner*—Almis R. Jankus
*Attorney, Agent, or Firm*—Fitzpatrick, Cella, Harper & Scinto

[57] ABSTRACT

A graph creation apparatus and method for creating graphs in the designated object scope of table data inhibits the creation of a meaningless graph, having too many items to be readable. An upper limit for the number of items for a column and for a line is determined for each graph type, whereby the designation of a number of items exceeding this upper limit is made invalid, and a warning is issued to the operator. Also, when the designated scope is displayed and updated on the table data in conjunction with the scope designation operation, updating for an invalid designation is inhibited. Prior to the designation operation, the effective designation scope is displayed. Alternatively, for the designation of a number of items exceeding the upper limit, data for a plurality of items are unified into one item, to bring the number of items within the upper limit to create a graph.

10 Claims, 24 Drawing Sheets

FIG. 2

| | C1<br>A Co. | C2<br>B Co. | C3<br>C Co. | C4<br>D Co. | C5<br>E Co. | C6<br>F Co. | C16<br>P Co. |
|---|---|---|---|---|---|---|---|
| R1 TV | 40 | 18 | 72 | 30 | 27 | 19 | 21 |
| R2 STEREO | 47 | 19 | 74 | 37 | 32 | 40 | 27 |
| R3 REFRIGERATOR | 42 | 17 | 72 | 44 | 37 | 36 | 33 |
| R4 WASHING MACHINE | 44 | 19 | 70 | 41 | 39 | 40 | 39 |
| R5 VIDEO CAMERA | 52 | 20 | 63 | 49 | 46 | 42 | 45 |
| R6 VTR (VIDEO TAPE RECORDER) | 53 | 22 | 64 | 52 | 49 | 40 | 51 |
| R7 ------ | 57 | 30 | 60 | 50 | 58 | 44 | 57 |
| R8 ------ | 63 | 42 | 54 | 48 | 62 | 48 | 63 |
| R9 ------ | 68 | 61 | 52 | 51 | 67 | 42 | 69 |
| R10 ------ | 71 | 69 | 50 | 52 | 72 | 38 | 75 |
| R11 ------ | 73 | 75 | 47 | 53 | 70 | 39 | 81 |
| R16 ------ | 93 | 112 | 34 | 62 | 98 | 43 | 111 |

FIG. 4

| | BAR GRAPH | STACK GRAPH | POLYGONAL LINE GRAPH | LAYER GRAPH | CIRCULAR GRAPH | RADAR CHART |
|---|---|---|---|---|---|---|
| MAXIMUM NUMBER OF COLUMNS $\ell$ | 5 | 5 | 5 | 5 | 6 | 6 |
| MAXIMUM NUMBER OF LINES m | 4 | 8 | 4 | 8 | 5 | 5 |

FIG. 5

STARTING POSITION (ℓ0, m0)

↓ LIMIT OF NORMAL ↔ ⇡ LIMIT OF COLUMN ERROR

| | C1 A Co. | C2 B Co. | C3 C Co. | C4 D Co. | C5 E Co. | C6 F Co. | ⋯ | C16 P Co. |
|---|---|---|---|---|---|---|---|---|
| R1 TV | 40 | 18 | 72 | 30 | 27 | 19 | | 21 |
| R2 STEREO | 47 | 19 | 74 | 37 | 32 | 40 | | 27 |
| R3 REFRIGERATOR | 42 | 17 | 72 | 44 | 37 | 36 | | 33 |
| R4 WASHING MACHINE | 44 | 19 | 70 | 41 | 39 | 40 | | 39 |
| R5 VIDEO CAMERA | 52 | 20 | 63 | 49 | 46 | 42 | | 45 |
| R6 VTR (VIDEO TAPE RECORDER) | 53 | 22 | 64 | 52 | 49 | 40 | | 51 |
| R7 ⋯ | 57 | 30 | 60 | 50 | 58 | 44 | | 57 |
| R8 ⋯ | 63 | 42 | 54 | 48 | 62 | 48 | | 63 |
| R9 ⋯ | 68 | 61 | 52 | 51 | 67 | 42 | | 69 |
| R10 ⋯ | 71 | 69 | 50 | 52 | 72 | 38 | | 75 |
| R11 ⋯ | 73 | 75 | 47 | 53 | 70 | 39 | | 81 |
| R16 ⋯ | 93 | 112 | 34 | 62 | 98 | 43 | | 111 |

⇡ LIMIT OF LINE

▨ BLOCK DESIGNATED SCOPE

FIG. 7
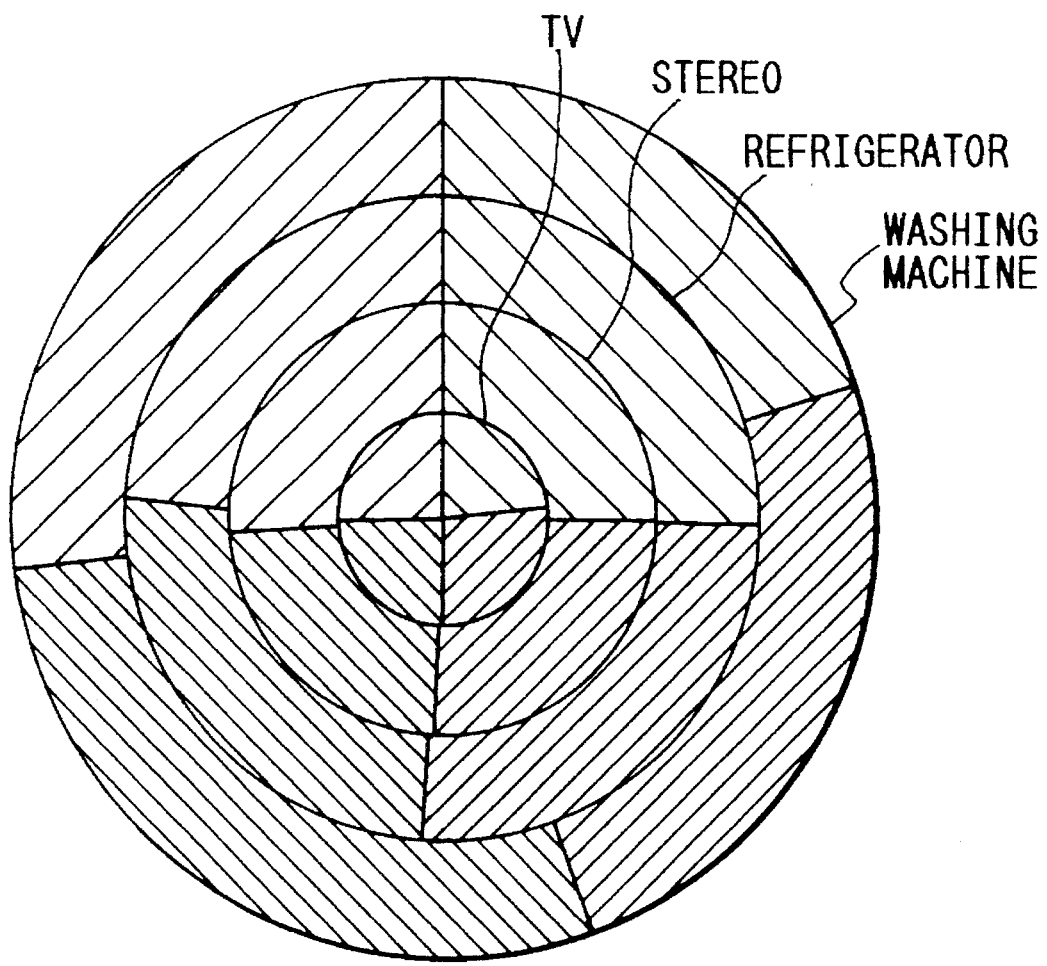
 A Co.
 B Co.
 C Co.
 D Co.

FIG. 8

Starting position $(\ell_0, m_0)$ = (COLUMN 2, LINE 2)

| | | C1<br>A Co. | C2<br>B Co. | C3<br>C Co. | C4<br>D Co. | C5<br>E Co. | C6<br>F Co. | ... | C16<br>P Co. |
|---|---|---|---|---|---|---|---|---|---|
| R1 | TV | 40 | 18 | 72 | 30 | 27 | 19 | | 21 |
| R2 | STEREO | 47 | 19 | 74 | 37 | 32 | 40 | | 27 |
| R3 | REFRIGERATOR | 42 | 17 | 72 | 44 | 37 | 36 | | 33 |
| R4 | WASHING MACHINE | 44 | 19 | 70 | 41 | 39 | 40 | | 39 |
| R5 | VIDEO CAMERA | 52 | 20 | 63 | 49 | 46 | 42 | | 45 |
| R6 | VTR (VIDEO TAPE RECORDER) | 53 | 22 | 64 | 52 | 49 | 40 | | 51 |
| R7 | ...... | 57 | 30 | 60 | 50 | 58 | 44 | | 57 |
| R8 | ...... | 63 | 42 | 54 | 48 | 62 | 48 | | 63 |
| R9 | ...... | 68 | 61 | 52 | 51 | 67 | 42 | | 69 |
| R10 | ...... | 71 | 69 | 50 | 52 | 72 | 38 | | 75 |
| R11 | ...... | 73 | 75 | 47 | 53 | 70 | 39 | | 81 |
| R16 | | 93 | 112 | 34 | 62 | 98 | 43 | | 111 |

[ ] EFFECTIVE DATA (INITIAL DISPLAY)

[- -] SCOPE DESIGNATION START

| | C1<br>A Co. | C2<br>B Co. | C3<br>C Co. | C4<br>D Co. | C5<br>E Co. | C6<br>F Co. | C16<br>P Co. |
|---|---|---|---|---|---|---|---|
| R1 TV | 40 | 18 | 72 | 30 | 27 | 19 | 21 |
| R2 STEREO | 47 | 19 | 74 | 37 | 32 | 40 | 27 |
| R3 REFRIGERATOR | 42 | 17 | 72 | 44 | 37 | 36 | 33 |
| R4 WASHING MACHINE | 44 | 19 | 70 | 41 | 39 | 40 | 39 |
| R5 VIDEO CAMERA | 52 | 20 | 63 | 49 | 46 | 42 | 45 |
| R6 VTR (VIDEO TAPE RECORDER) | 53 | 22 | 64 | 52 | 49 | 40 | 51 |
| R7 | 57 | 30 | 60 | 50 | 58 | 44 | 57 |
| R8 | 63 | 42 | 54 | 48 | 62 | 48 | 63 |
| R9 | 68 | 61 | 52 | 51 | 67 | 42 | 69 |
| R10 | 71 | 69 | 50 | 52 | 72 | 38 | 75 |
| R11 | 73 | 75 | 47 | 53 | 70 | 39 | 81 |
| R16 | 93 | 112 | 34 | 62 | 98 | 43 | 111 |

BLOCK DESIGNATION (e.g. 2 COLUMN)

☐ EFFECTIVE DATA (UPDATE DISPLAY FOR 2 COLUMN)

FIG. 10

| NUMBER OF COLUMNS $q$ | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| NUMBER OF LINES $m$ | 20 | 10 | 7 | 5 | 4 | 4 | 3 | 3 | 2 | 2 | 2 | 1 | 1 | 1 | 1 | 1 |

FIG. 12

| | | C1 | C2 | C3 | C4 | C5 | C6 | ⋯ | C16 |
|---|---|---|---|---|---|---|---|---|---|
| | | A Co. | B Co. | C Co. | D Co. | E Co. | F Co. | | P Co. |
| R1 | TV | 40 | 18 | 72 | 30 | 27 | 19 | | 21 |
| R2 | STEREO | 47 | 19 | 74 | 37 | 32 | 40 | | 27 |
| R3 | REFRIGERATOR | 42 | 17 | 72 | 44 | 37 | 36 | | 33 |
| R4 | WASHING MACHINE | 44 | 19 | 70 | 41 | 39 | 40 | | 39 |
| R5 | VIDEO CAMERA | 52 | 20 | 63 | 49 | 46 | 42 | | 45 |
| R6 | VTR (VIDEO TAPE RECORDER) | 53 | 22 | 64 | 52 | 49 | 40 | | 51 |
| R7 | ------ | 57 | 30 | 60 | 50 | 58 | 44 | | 57 |
| R8 | ------ | 63 | 42 | 54 | 48 | 62 | 48 | | 63 |
| R9 | ------ | 68 | 61 | 52 | 51 | 67 | 42 | | 69 |
| R10 | ------ | 71 | 69 | 50 | 52 | 72 | 38 | | 75 |
| R11 | ------ | 73 | 75 | 47 | 53 | 70 | 39 | | 81 |
| R16 | ------ | 93 | 112 | 34 | 62 | 98 | 43 | | 111 |

| | (C1, R4+R5+R6) | (C2, R4+R5+R6) | (C3, R4+R5+R6) | (C4, R4+R5+R6) | (C5, R4+R5+R6) | (C6, R4+R5+R6) |
|---|---|---|---|---|---|---|
| R4' OTHERS | 149 | 61 | 197 | 142 | 134 | 122 |

| | C1<br>A Co. | C2<br>B Co. | C3<br>C Co. | C4<br>D Co. | C5<br>E Co. | C6<br>F Co. | ~ | C16<br>P Co. |
|---|---|---|---|---|---|---|---|---|
| R1 TV | 40 | 18 | 72 | 30 | 27 | 19 | | 21 |
| R2 STEREO | 47 | 19 | 74 | 37 | 32 | 40 | | 27 |
| R3 REFRIGERATOR | 42 | 17 | 72 | 44 | 37 | 36 | | 33 |
| R4 WASHING MACHINE | 44 | 19 | 70 | 41 | 39 | 40 | | 39 |
| R5 VIDEO CAMERA | 52 | 20 | 63 | 49 | 46 | 42 | | 45 |
| R6 VTR (VIDEO TAPE RECORDER) | 53 | 22 | 64 | 52 | 49 | 40 | | 51 |
| R7 ------ | 57 | 30 | 60 | 50 | 58 | 44 | | 57 |
| R8 ------ | 63 | 42 | 54 | 48 | 62 | 48 | | 63 |
| R9 ------ | 68 | 61 | 52 | 51 | 67 | 42 | | 69 |
| R10 ------ | 71 | 69 | 50 | 52 | 72 | 38 | | 75 |
| R11 ------ | 73 | 75 | 47 | 53 | 70 | 39 | | 81 |
| R16 ------ | 93 | 112 | 34 | 62 | 98 | 43 | | 111 |

DESIGNATED COLUMN
DESIGNATED LINE

FIG. 16

|  | C1<br>A Co. | C2<br>B Co. | C3<br>C Co. | C4<br>D Co. | C5<br>E Co. | C6<br>F Co. | ... | C16<br>P Co. |
|---|---|---|---|---|---|---|---|---|
| R1 TV | 40 | 18 | 72 | 30 | 27 | 19 | ... | 21 |
| R2 STEREO | 47 | 19 | 74 | 37 | 32 | 40 | ... | 27 |
| R3 REFRIGERATOR | 42 | 17 | 72 | 44 | 37 | 36 | ... | 33 |
| R4 WASHING MACHINE | 44 | 19 | 70 | 41 | 39 | 40 | ... | 39 |
| R5 VIDEO CAMERA | 52 | 20 | 63 | 49 | 46 | 42 | ... | 45 |
| R6 VTR (VIDEO TAPE RECORDER) | 53 | 22 | 64 | 52 | 49 | 40 | ... | 51 |
| R7 ...... | 57 | 30 | 60 | 50 | 58 | 44 | ... | 57 |
| R8 ...... | 63 | 42 | 54 | 48 | 62 | 48 | ... | 63 |
| R9 ...... | 68 | 61 | 52 | 51 | 67 | 42 | ... | 69 |
| R10 ...... | 71 | 69 | 50 | 52 | 72 | 38 | ... | 75 |
| R11 ...... | 73 | 75 | 47 | 53 | 70 | 39 | ... | 81 |
| R16 ...... | 93 | 112 | 34 | 62 | 98 | 43 | ... | 111 |

| DESIGNATED COLUMN | C1 | C3 | C4 | C6 | C16 |
|---|---|---|---|---|---|
| DESIGNATED LINE | R2 | R3 | R5 | R6 | |

FIG. 17

|    |                    | C1    | C3    | C4    | C6    | C7    |
|----|--------------------|-------|-------|-------|-------|-------|
|    |                    | A Co. | C Co. | D Co. | F Co. | P Co. |
| R2 | STEREO             | 47    | 74    | 37    | 40    | 27    |
| R3 | REFRIGERATOR       | 42    | 72    | 44    | 36    | 33    |
| R5 | VIDEO CAMERA       | 52    | 63    | 49    | 42    | 45    |
| R6 | VTR (VIDEO TAPE RECORDER) | 53 | 64 | 52 | 40 | 51 |

FIG. 21

| | C1 | C2 | C3 | C4 | C5 | C6 | ... | C16 |
|---|---|---|---|---|---|---|---|---|
| | A Co. | B Co. | C Co. | D Co. | E Co. | F Co. | | P Co. |
| R1 TV | 40 | 18 | 72 | 30 | 27 | 19 | | 21 |
| R2 STEREO | 47 | 19 | 74 | 37 | 32 | 40 | | 27 |
| R3 REFRIGERATOR | 42 | 17 | 72 | 44 | 37 | 36 | | 33 |
| R4 WASHING MACHINE | 44 | 19 | 70 | 41 | 39 | 40 | | 39 |
| R5 VIDEO CAMERA | 52 | 20 | 63 | 49 | 46 | 42 | | 45 |
| R6 VTR (VIDEO TAPE RECORDER) | 53 | 22 | 64 | 52 | 49 | 40 | | 51 |
| R7 ...... | 57 | 30 | 60 | 50 | 58 | 44 | | 57 |
| R8 ...... | 63 | 42 | 54 | 48 | 62 | 48 | | 63 |
| R9 ...... | 68 | 61 | 52 | 51 | 67 | 42 | | 69 |
| R10 ...... | 71 | 69 | 50 | 52 | 72 | 38 | | 75 |
| R11 ...... | 73 | 75 | 47 | 53 | 70 | 39 | | 81 |
| R16 | 93 | 112 | 34 | 62 | 98 | 43 | | 111 |

FIG. 22

| R2 | STEREO | C Co. | A Co. | F Co. | D Co. | E Co. | B Co. ⌐A |
|---|---|---|---|---|---|---|---|
|  |  | 74 | 47 | 40 | 37 | 32 | 19 |

→

| R2 | STEREO | C Co. | A Co. | F Co. | D Co. | E Co. | B Co. |
|---|---|---|---|---|---|---|---|
|  |  | 74 | 47 | 40 | 37 | 32 | 19 |
|  |  | 29.7% | 18.9% | 16.1% | 14.9% | 12.9% | 7.6% |

→

| R2 | STEREO | C Co. | A Co. | F Co. | D Co. | OTHERS ⌐B |
|---|---|---|---|---|---|---|
|  | STEREO | 74 | 47 | 40 | 37 | 51 |
|  |  | 29.7% | 18.9% | 16.1% | 14.9% | 20.5% |

FIG. 25

STARTING POSITION (l1,m2) = COLUMN 1, LINE 2
CHANGED STARTING POSITION (l2,m7) = COLUMN 2, LINE 7

|     |                      | C1<br>A Co. | C2<br>B Co. | C3<br>C Co. | C4<br>D Co. | C5<br>E Co. | C6<br>F Co. | ~ ~ | C16<br>P Co. |
|-----|----------------------|-------------|-------------|-------------|-------------|-------------|-------------|-----|--------------|
| R1  | TV                   | 40          | 18          | 72          | 30          | 27          | 19          |     | 21           |
| R2  | STEREO               | 47          | 19          | 74          | 37          | 32          | 40          |     | 27           |
| R3  | REFRIGERATOR         | 42          | 17          | 72          | 44          | 37          | 36          |     | 33           |
| R4  | WASHING MACHINE      | 44          | 19          | 70          | 41          | 39          | 40          |     | 39           |
| R5  | VIDEO CAMERA         | 52          | 20          | 63          | 49          | 46          | 42          |     | 45           |
| R6  | VTR (VIDEO TAPE RECORDER) | 53      | 22          | 64          | 52          | 49          | 40          |     | 51           |
| R7  | ------               | 57          | 30          | 60          | 50          | 58          | 44          |     | 57           |
| R8  | ------               | 63          | 42          | 54          | 48          | 62          | 48          |     | 63           |
| R9  | ------               | 68          | 61          | 52          | 51          | 67          | 42          |     | 69           |
| R10 | ------               | 71          | 69          | 50          | 52          | 72          | 38          |     | 75           |
| R11 | ------               | 73          | 75          | 47          | 53          | 70          | 39          |     | 81           |
| R16 | ------               | 93          | 112         | 34          | 62          | 98          | 43          |     | 111          |

AA, BB

GRAPH DRAWING

BACKGROUND OF THE INVENTION

1. Field of the Invention

The present invention relates to a graph creation apparatus and method, for creating graphs from data in table form.

2. Related Background Art

Conventionally, when displaying or printing a graph from table data as listed, the graph was created for the entire scope or designated scope of the table.

However, in such conventional instance, when a great number of graphic object data were provided, the graph created would be indiscriminating. For example, some problems arose in that in a polygonal line graph, the lines would become indistinguishable because if their number; and the number of divisions in a circular graph, or the number of bars in a bar graph would become too great to distinguish the hatching pattern for discriminating data.

Conventionally, in such a case, the operator would use repetitively attempted the trial and error of changing the graphic object scope by referring to the output result to obtain a proper graph.

SUMMARY OF THE INVENTION

Therefore, an objective of the invention is to provide a graph creation of drawing apparatus and method capable of preventing the scope designation exceeding a proper scope when designating the graphic scope in the table data.

Another objective of the invention is to provide a graph drawing apparatus an method capable of informing the operator of a proper data scope when designating the graphic scope for the tabular data.

Another objective of the invention is to provide a graph drawing apparatus and method for unifying a part of data in a graphic object scope designated for the tabular data to make a usable graphic, when the number of data per se is beyond a proper scope.

According to one aspect, the present invention which achieves these objectives relates to a graph drawing apparatus comprising a first storage means which stores a table containing a plurality of cells, and means for displaying the table. The apparatus has means for designating a block of cells in the displayed table, and means for counting the number of cells in either a column or a line, or both, in the designated block. An upper limit to be imposed on the number or cells in the column or the line, or both, suitable for drawing a graph corresponding to the numerical data in those cells, is stored in a second storage means, and a discriminating means discriminates whether the number of cells in the column or line or both counted by the counting means is greater than the stored upper limit. A graph drawing means is provided for drawing a graph based on that numerical data, and a control means controls the graph drawing means to draw such a graph provided that the number of cells counted is discriminated not to be greater than the stored upper limit. Otherwise, the control means inhibits the drawing means from drawing such graph.

According to another aspect, the present invention which achieves these objectives relates to a graph drawing apparatus comprising a first storage means which stores a table containing a plurality of cells, means for displaying the table, and means for designating a block of cells in the displayed table. A count means counts the number of cells in a column, or in a line, or both, in the designated block, and a discriminating means discriminates whether the number counted is greater than an upper limit stored in a second storage means. The stored upper limit is one which should not be exceeded in drawing a graph corresponding to the numerical data in the cells. A graph drawing means is also provided for drawing a graph based on the numerical data in the designated block, and a first control means controls the graph drawing means to draw such a graph provided that the counted number of cells is discriminated not to be greater than the stored upper limit. A summation means is provided for summing up numerical data in a predetermined number of cells in the designated block, responsive to a discrimination that the counted number of cells is greater than the stored upper limit. A second control means controls the graph drawing means to draw a graph based on the data summed up by the summation means, as well as data in the other cells of the block.

According to still another aspect, the present invention which achieves these objectives relates to a graph drawing apparatus comprising a first storage means for storing a table containing a plurality of cells, means for displaying the table and means for designating a block of cells in the displayed table. A count means counts the number of cells in a column or in a line, or both, of the designated block, and a comparison means compares that number with an upper limit stored in a second storage means. The stored upper limit represents a number of cells which should not be exceeded in the drawing of a graph corresponding to a body of numerical data. A graph drawing means draws a graph based on the numerical data in the designated block under control of a first control means, provided that the counted number of cells is not greater than the stored upper limit. A summation means sums up numerical data in a number of cells greater than the difference between the counted number and the upper limit into a single datum, responsive to a comparison that shows that the counted number of cells is greater than the stored upper limit. A second control means controls the graph drawing means to draw a graph based on the data so summed up.

In another aspect of the invention, a graph drawing method comprises the steps of storing a table containing plural cells, displaying the table, designating a block of cells in the displayed table, and counting the number of cells in a column or in a line, or both, in the block. A discrimination is then performed as to whether the count of cells is greater than an upper limit on such number, and a graph is drawn based on the numerical data in the block provided that the counted number of cells is not greater than the upper limit. Alternatively, if the counted number exceeds the upper limit, then drawing of a graph based on the data in the block is inhibited.

Other objectives and advantages besides those discussed above shall be apparent to those skilled in the art from the description of the preferred embodiment of the invention which follows. In the description, reference is made to accompanying drawings, which forms a part thereof, and which illustrate an example of the invention. Such example, however, is not exhaustive of all the various possible embodiments of the invention, and therefore reference is made to the claims which follow the description for determining the scope of the invention.

BRIEF DESCRIPTION OF THE DRAWINGS

FIG. 2 shows an example of table data to be used for graphic object.

4 shows the maximum number of columns and the maximum number of lines allowable for making a graphic for each graph classification.

FIG. 5 shows an example of table data with a graphic object scope designated.

Figure 6:
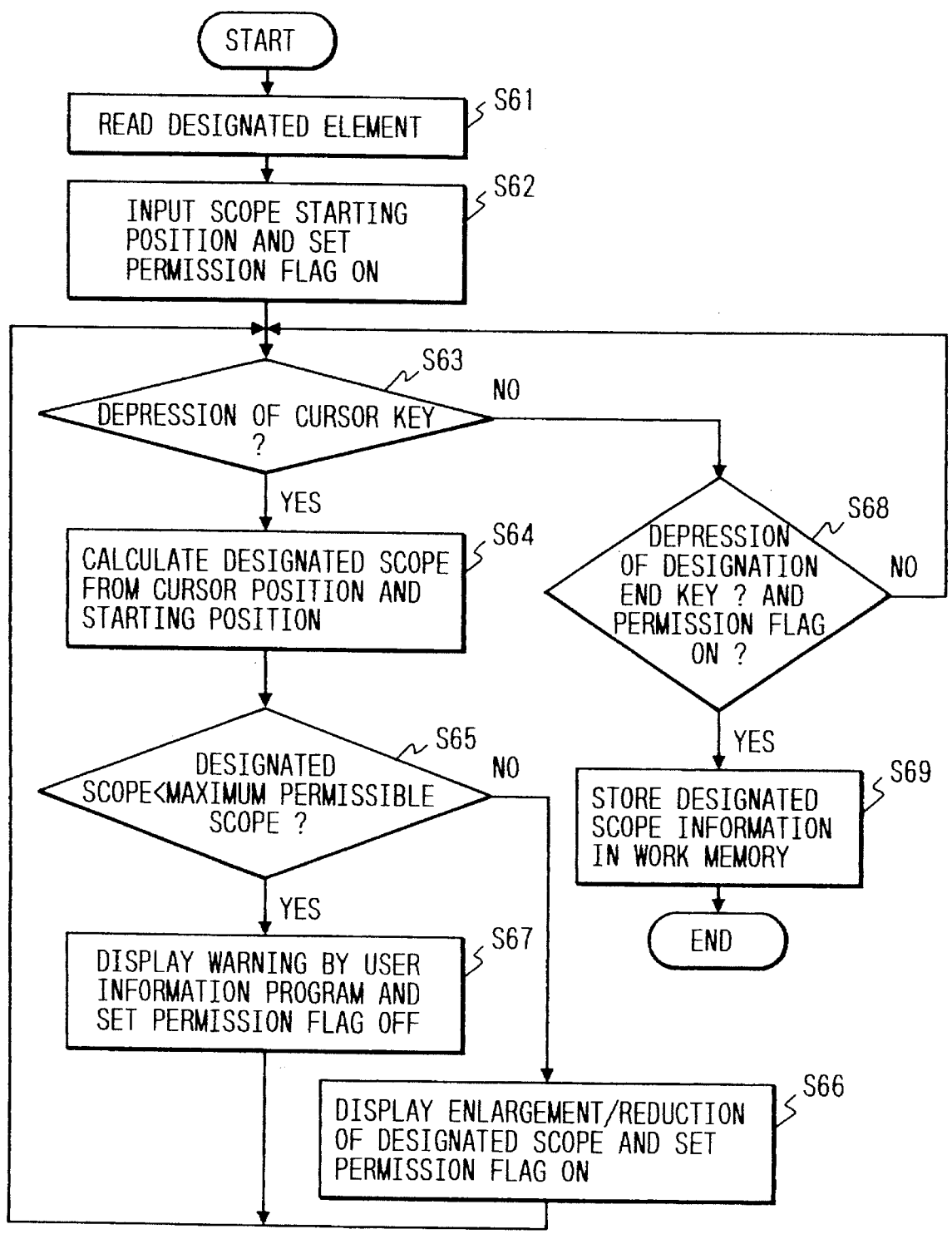

FIG. 6 is a flowchart of a graphic object scope designating process.

FIG. 7 exemplifies a graph created.

Figure 9:

FIGS. 8 and 9 each show an example of tabular data where a graphic object designation effective scope is indicated.

FIG. 10 shows the relation between the number of columns and the number of lines effective for graphics.

Figure 11:
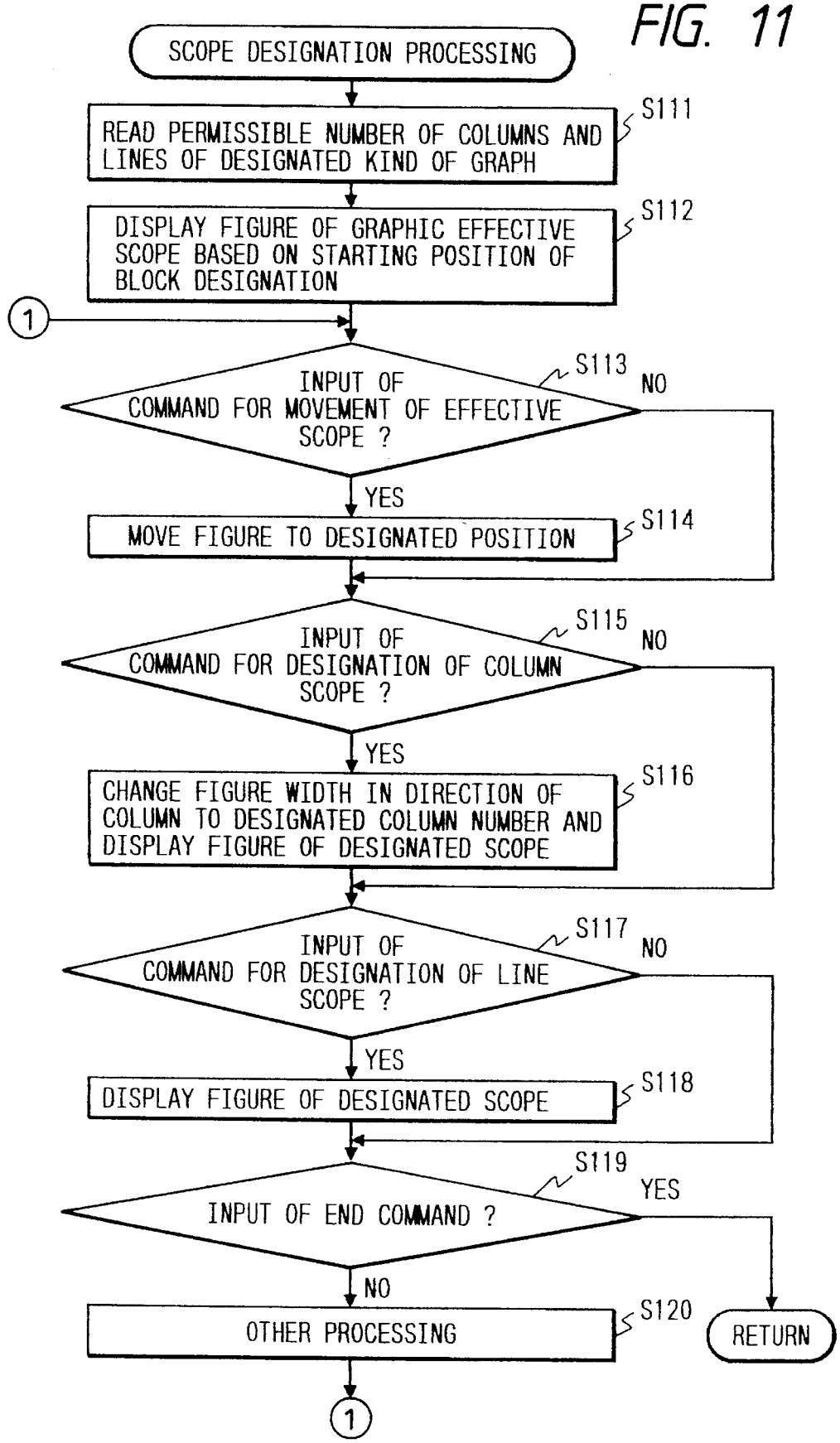

FIG. 11 is a flowchart of a graphic object scope designating process.

FIG. 12 shows the relation between data of plural lines and unified data.

Figure 13:
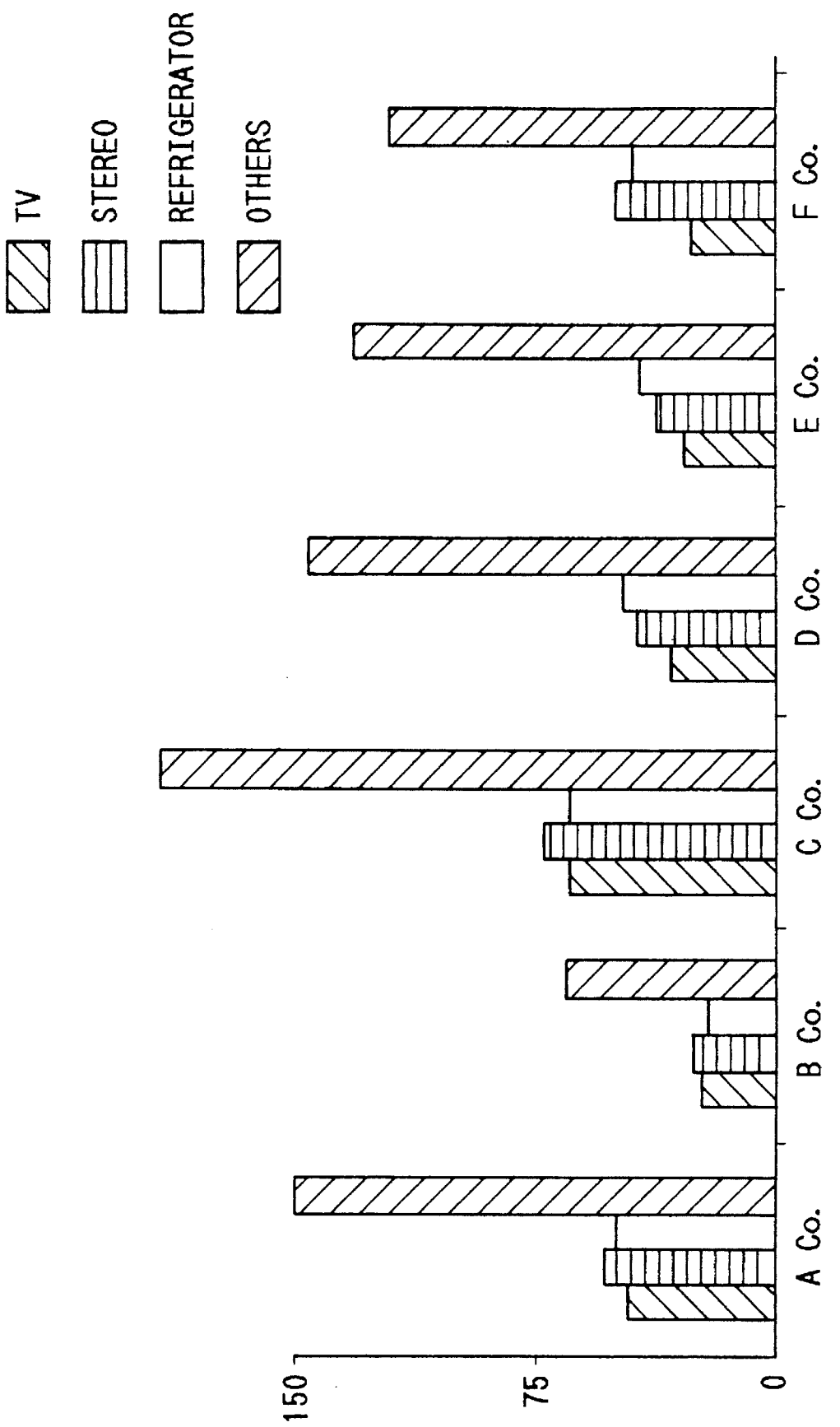

FIG. 13 exemplifies a graph created.

Figure 14:
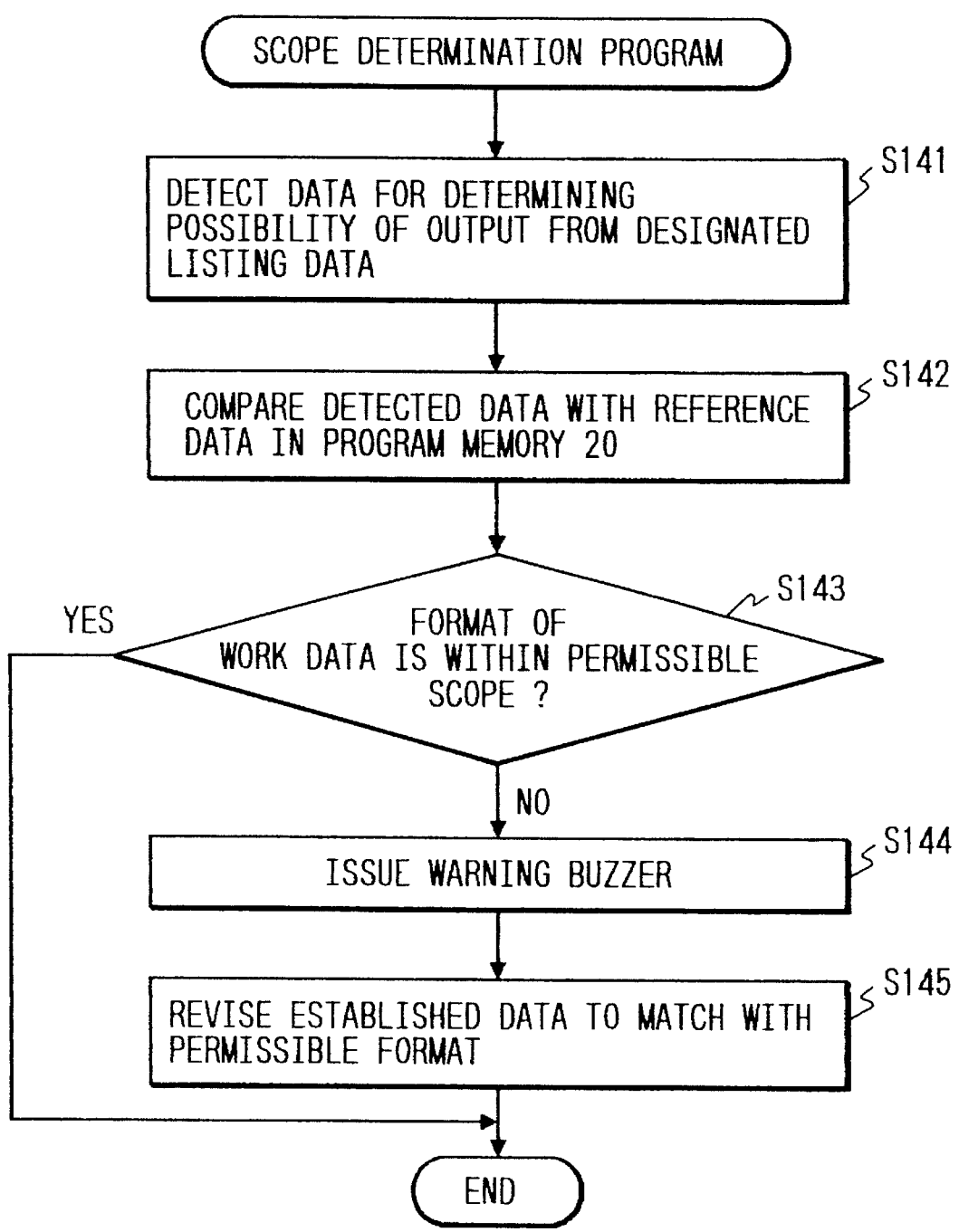

FIG. 14 is a flowchart of graphic object scope designating process.

Figure 15:

FIG. 15 shows an example of a display screen for use in designating the graphic object scope.

FIG. 16 shows an example of a display screen with the graphic object scope designated.

FIG. 17 shows an example of data in the scope designated as the graphic object scope.

Figure 18:
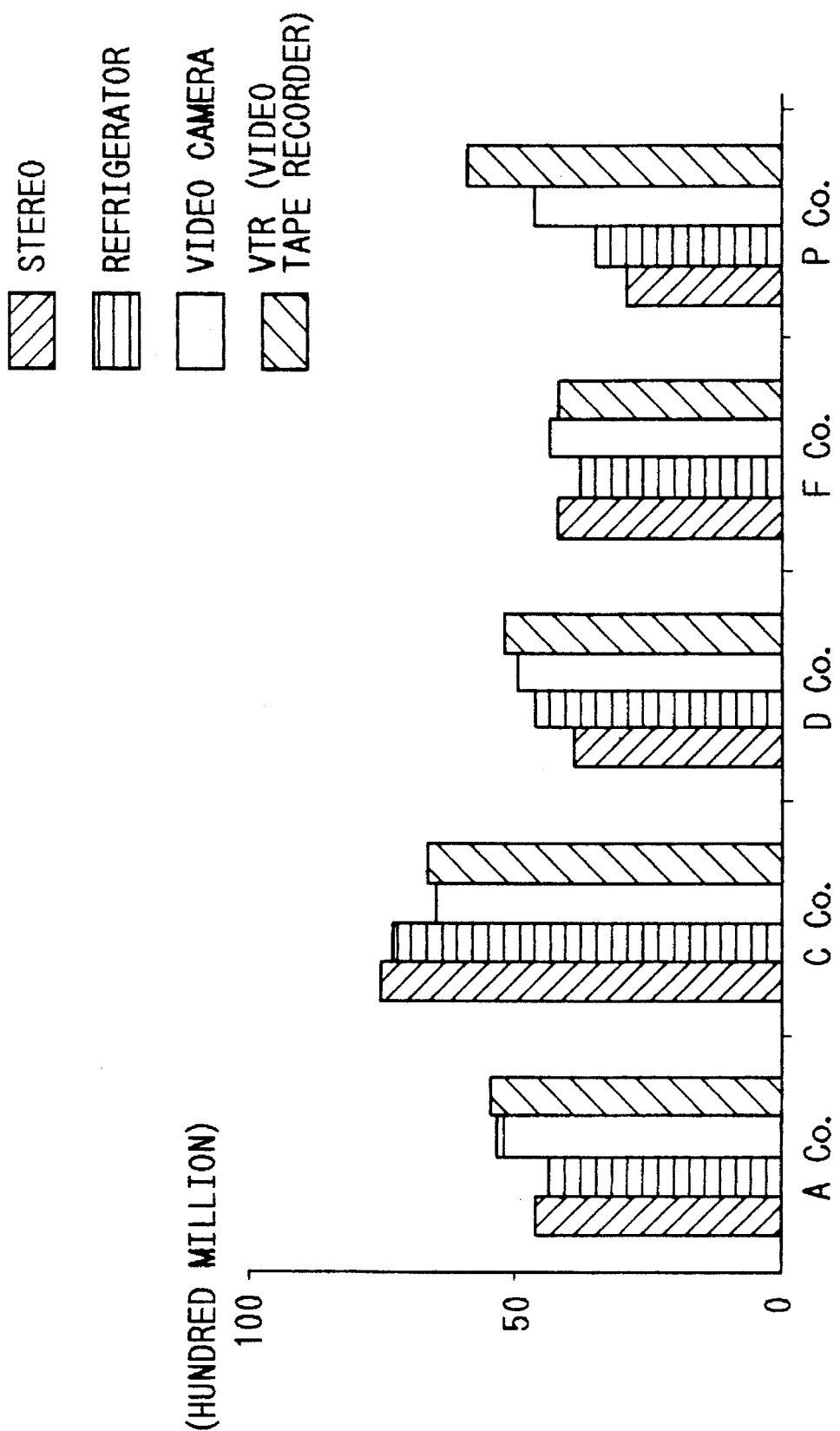

FIG. 18 exemplifies a graph created.

Figure 19:
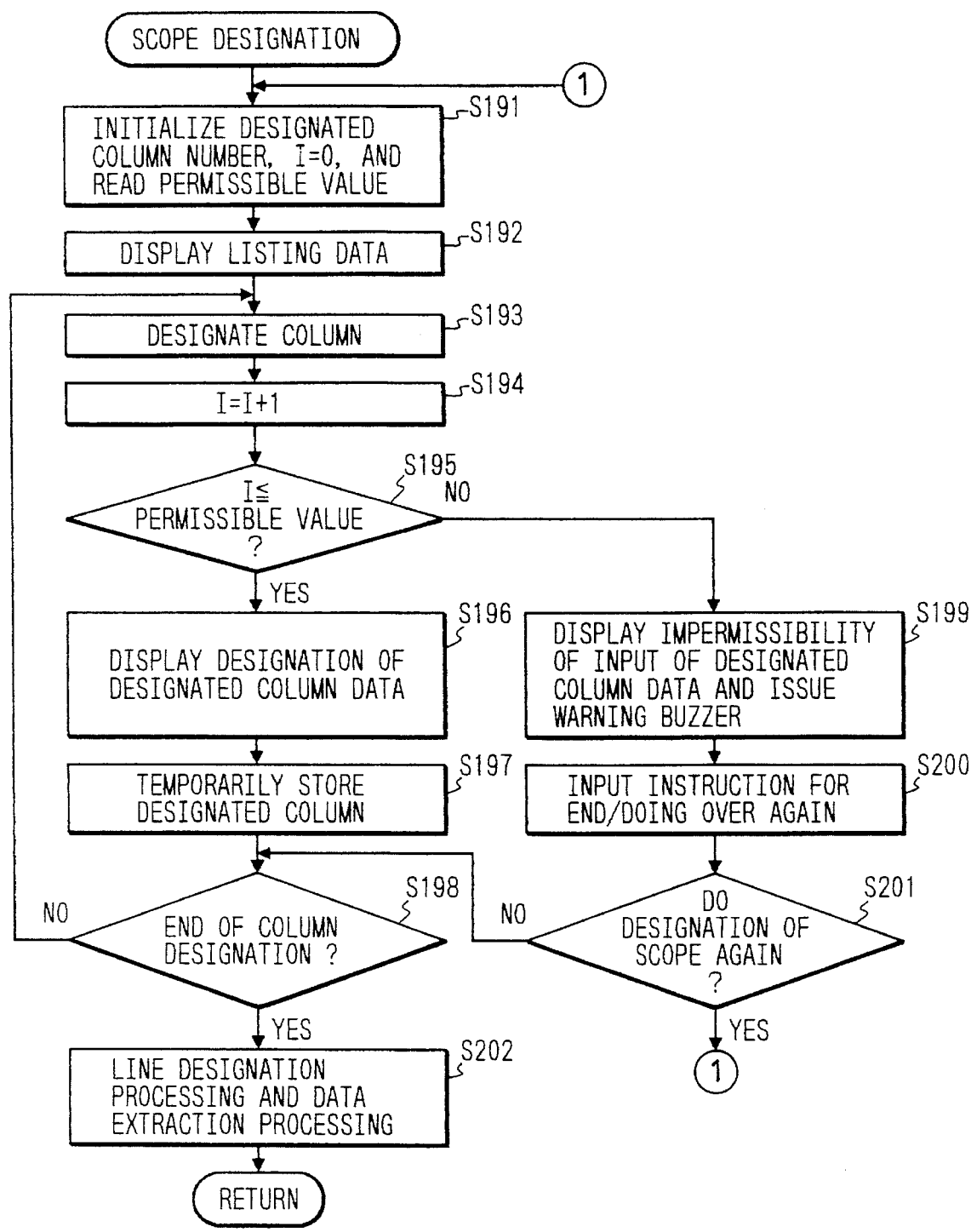

FIG. 19 is a flowchart of a graphic object scope designating process.

Figure 20:
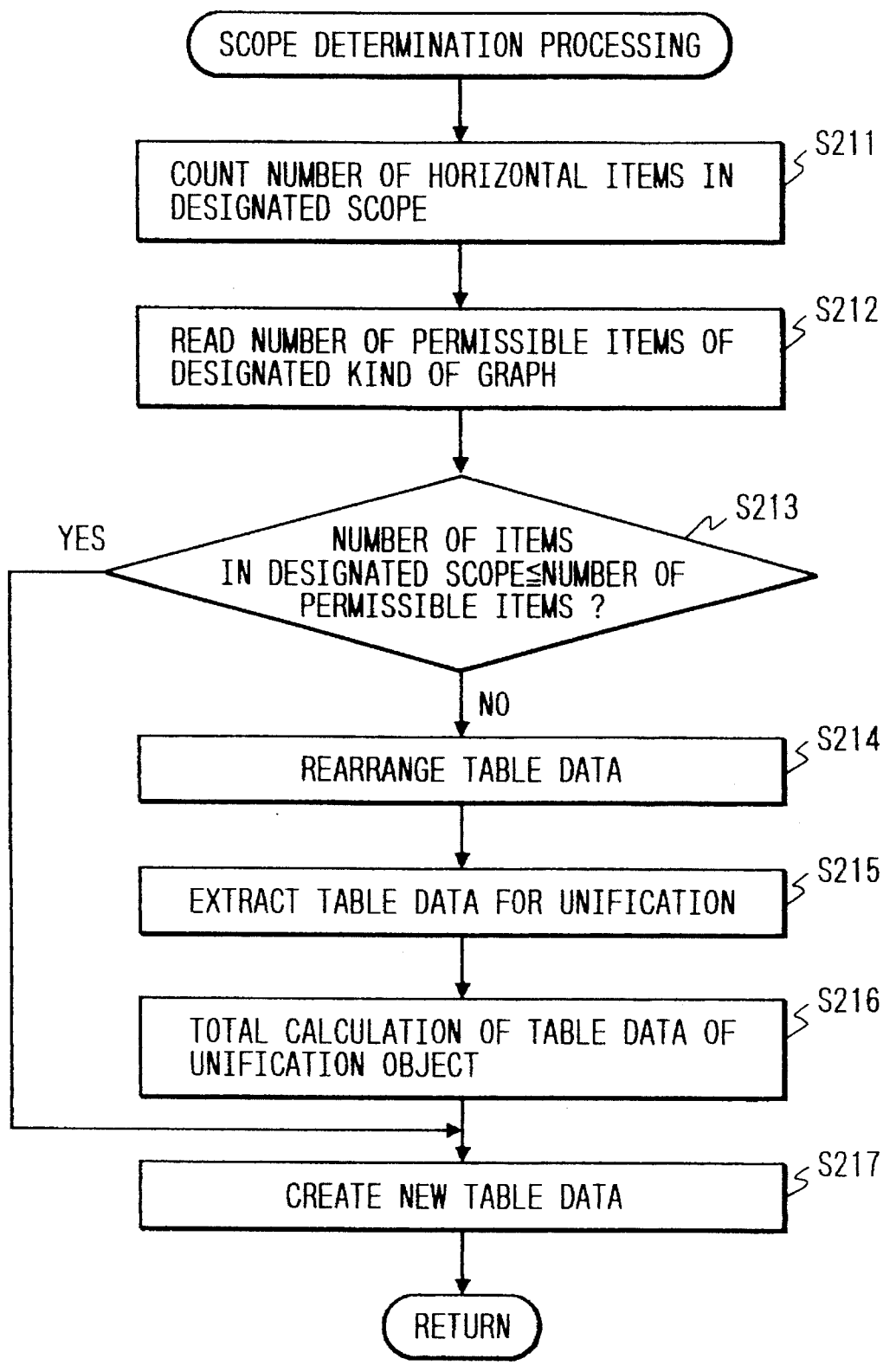

FIG. 20 is a flowchart of a graphic object scope designating process.

FIG. 21 shows an example of tabular data with the graphic object scope designated.

FIG. 22 is a diagram showing a step of processing data in the scope designated as the graphic object scope.

Figure 23:
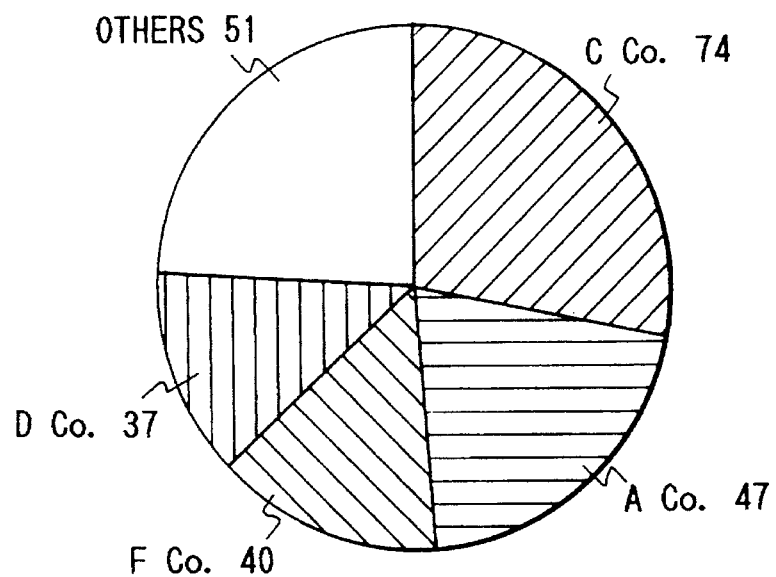

FIG. 23 shows an example of a graph created.

Figure 24:
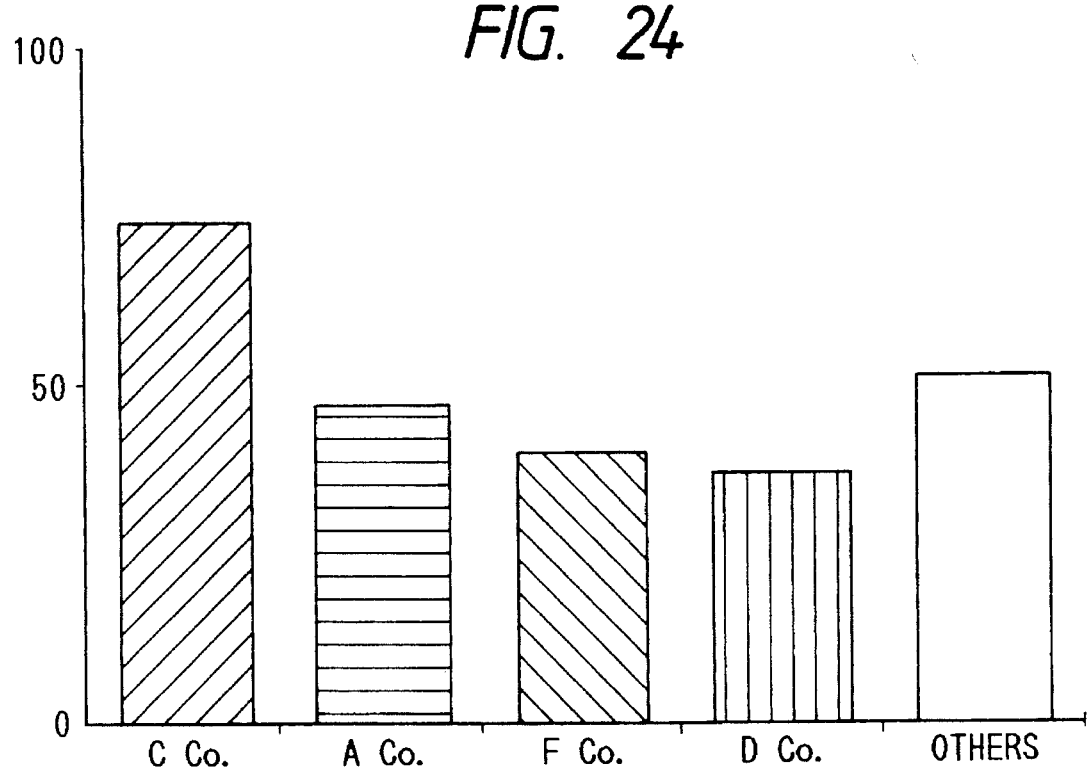

FIG. 24 shows an example of a graph created.

FIG. 25 shows an operation of designating the graphic object scope on the tabular data.

DESCRIPTION OF THE PREFERRED EMBODIMENTS

Figure 1:
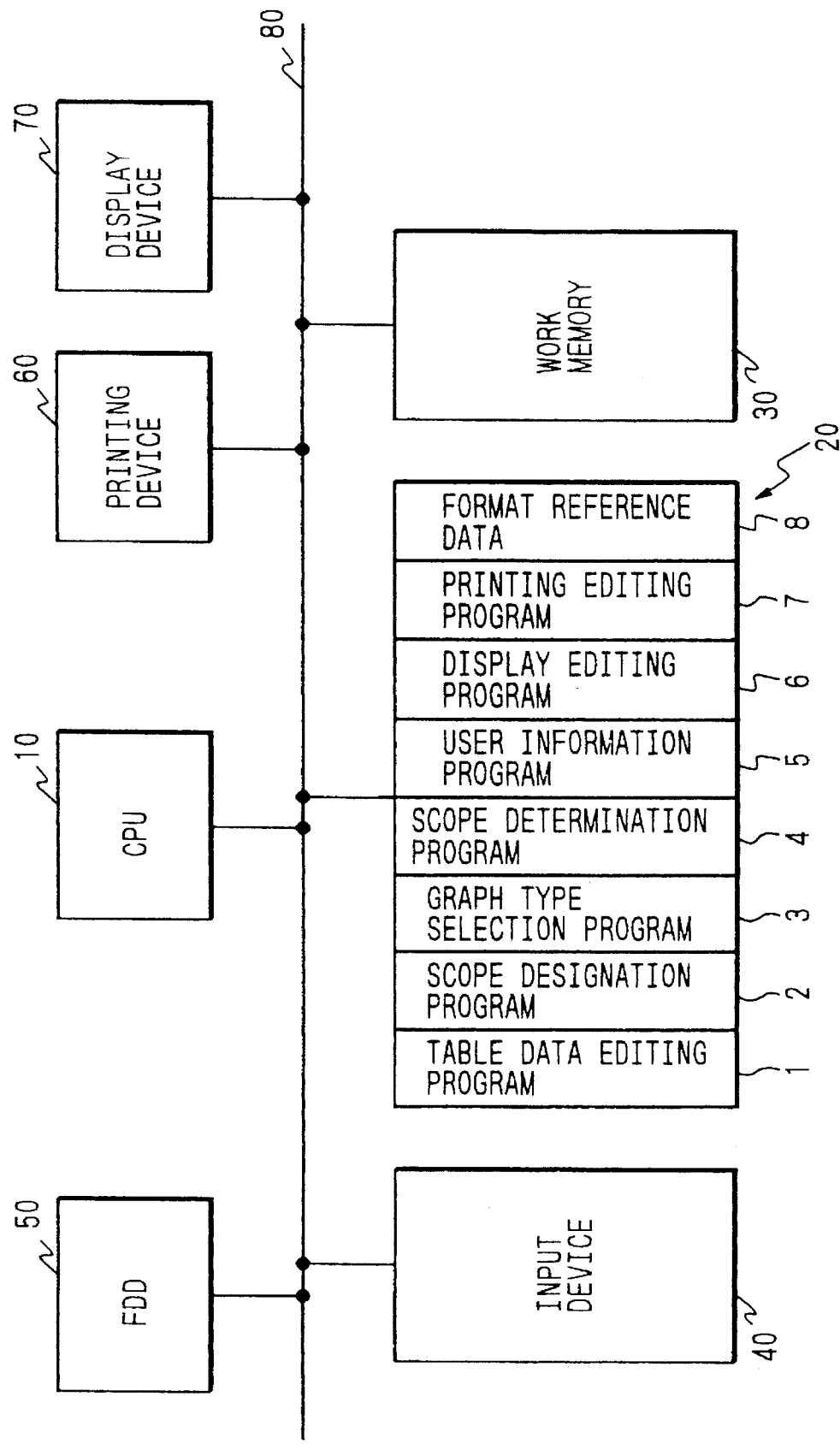
FIG. 1 is a diagram showing the block configuration of a graph creation apparatus according to an embodiment of the present invention.

The preferred embodiments of the present invention will now be described with reference to the drawings.
[Embodiment 1]
FIG. 1 is a diagram showing the block configuration of a graph creation apparatus according to the present invention. CPU 10 performs various processings such as a graph creation processing by reading and executing a variety of programs stored in a program memory 20, while controlling each unit of the apparatus. A work memory 30 stores tabular data for graphic and dot patterns for created graph data. An input device 40 consists of a keyboard for the input of characters or a mouse for designating the position on the display, which is useful for the input and designation of a variety of data, as well as for the instruction of operation.

Table data or graphic data created is stored in an FDD (Floppy disk drive) 50, if necessary.

Also, the table data or graphic data created is displayed on a display device 60 such as a CRT, and further, is printed by a printing device such as a laser beam printer, if necessary. CPU 10, program memory 20, work memory 30, input device 40, FDD 50, printing device 60, and display device 70 are connected to a common bus 80.

The functions of programs stored in the program memory 20 are as follows.

Table data editing program 1 is a program for executing the text editing or table data creation/editing.

Scope designation program 2 is a program for designating the graphic object scope from table data created by the program 1.

Graph type selection program 3 is a program for designating the type of a graph to be displayed or printed, for example, a bar graph or a circular graph.

Scope determination program 4 is a program for determining whether the output result is readable when the data is visually output as a graph with the graphic object scope of table data designated.

User information program 5 is a program for displaying a result of determination executed by the scope determination program 4 on the display device 70.

Display editing program 6 and printing editing program 7 are programs displaying and printing a created graph, respectively.

In the program memory 20, format reference data 8 indicating the size of table data allowable for graphic transformation as shown in FIG. 4 is stored.

One example of table data created by the table data editing program 1 is shown in FIG. 2.

In the figure, C1, C2, . . . , C16 indicate the column number and R1, R2, . . . , R16 indicate the line number. This table lists sales data of several products from a company to P company (unit: million dollars).

After such listing data is read from FDD 50 into CPU 10, and displayed on the display device 70, the operator instructs the CPU 10 to execute the scope designation program 2 from the input device 40. The operator designates a graphic object scope for table data via the input device 40. The CPU 10 discriminates the scope designated by the operator based on the scope designation program 2, and displays the designated scope in the block form as shown in FIG. 5. The methods of scope designation include block designation with a cursor, and designation by inputting the number of columns and of the lines to be included.

After scope designation, the CPU 10 executes the graph type selection program 3 to accept a command from the operator as to the information such as the graph type and the size of printing a graph title input via the input device 40. After the scope designation and graph selection, the CPU 10 determines whether or not table data is to be made graphic by the scope determination program 4.

When the designated scope can not be made graphic at all owing to the incapability of display device 70 or printing device 60 (due e.g. to the number of dots in longitudinal/horizontal direction) or by virtue of the graphic design, the scope designated is internally changed to the maximum scope allowable for the output. In doing so, the CPU 10 informs the creator of a display error with either a buzzer or a display message, or both, by the user information program 6.

Information data of the scope determined is stored in a designated scope storage area in the work memory 30. Note that the stored data may be scope information of character codes or the image data for graphic which is converted from the numerical data in the table data based thereon into display/print form.

Based on such data, the CPU 10 causes the display program 6 or print program 7 to display or print.

In this embodiment, when a graph type is determined by the graph type selection program 3 of FIG. 1 in making graphic from the table data portion of document data or table data capable of being merged into created document by the table creation function, the scope de signation operation by the operator is restricted by the scope designation program 2 in accordance with the graph type selected and the representation capability of the display or printing device.

A specific example will be given below for the explanation. Table data as shown in FIG. 2 is assumed to be table data created in the document, or table data not containing other data. FIG. 2 shows the sales of electrical products from A company to P company.

When making graphic from this table data, all table data can not be made graphic owing to the incapability of the display or printing device, whereby the scope designation for graphic must be performed. FIG. 6 is a flowchart of the scope designation processing.

Figure 3:
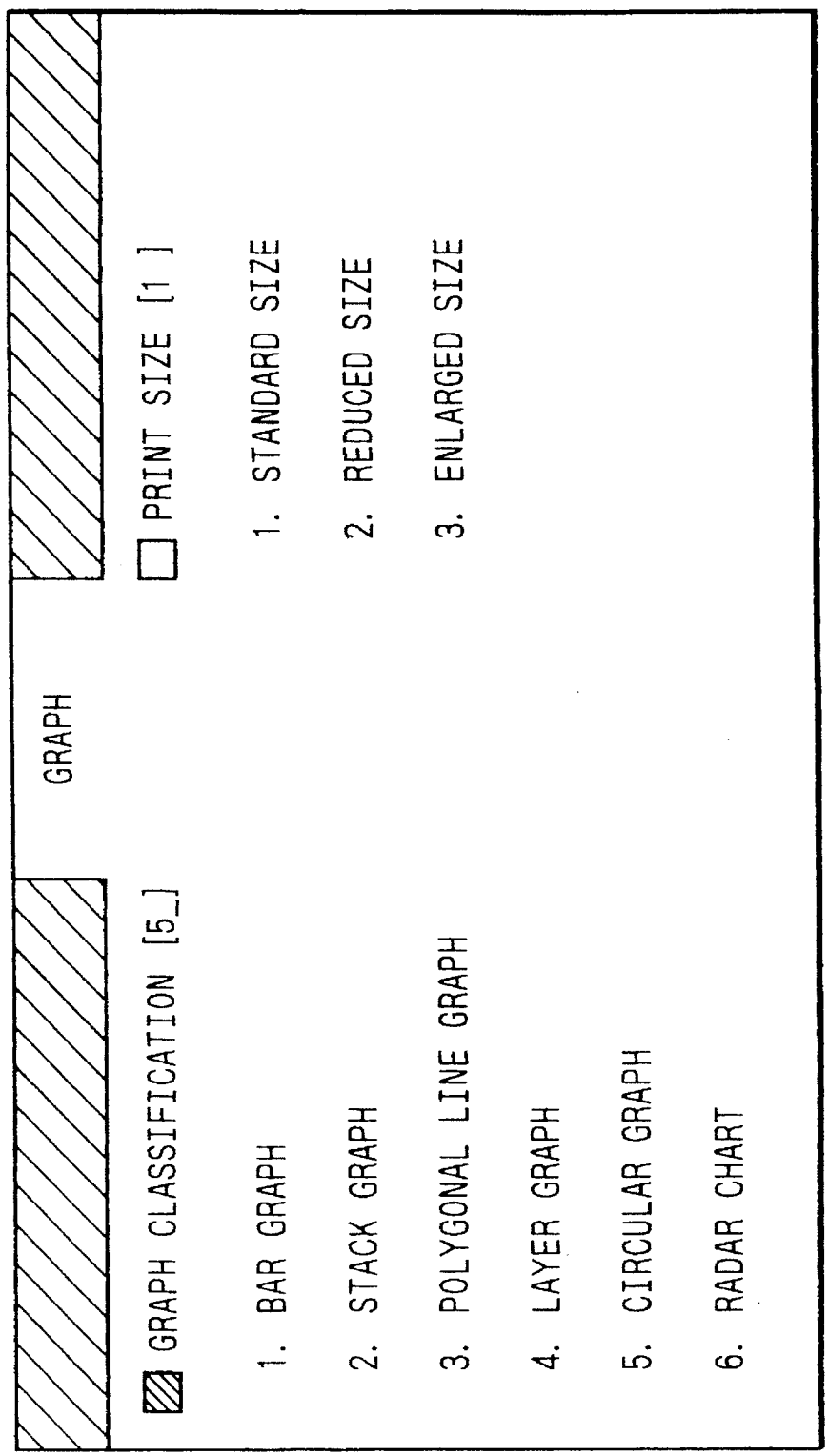
FIG. 3 shows a display screen for use in selecting the graph classification. FIG.

After completing the listing data with the editing function, the operator enters an instruction for graphic via the input device 40. The graph type selection program 3 is initiated, so that a menu for selecting the graph type or size is displayed. An example of menu display is shown in FIG. 3. If a desired graph type is indicated in the menu screen via the keyboard 9 by the operator, the execution procedure of the CPU 10 transfers to the scope designation program 2. The CPU 10 reads the designated element by referring to the format reference data in the memory 20, i.e., a restriction table of FIG. 4 (step S61).

When the operator creates a circular graph from a part of table data of FIG. 2, the permissible number of columns and the permissible number of lines for printing table data are $1=6$ and $m=5$, respectively. Note that the number of columns corresponds to the number of divisions in a circle, and the number of lines corresponds to the number of circles in a multiple circular graph.

If the operator indicates the starting position of the scope designation (see FIG. 5) with a movement key of the input device 40 (herein, a cursor key is used, but a TAB key or back space key may be used), a permission flag is set on (step S62).

Next, if the scope designation ending position is moved by depressing the cursor key at step S63, the CPU 10 calculates the dimension of the designated scope (number of columns, number of lines) from the scope ending position designated at present and the scope starting position already designated (step S64) by the scope determination program 4.

Next, the dimension of calculated designation scope and the dimension of permissible scope indicated by the designated element are compared (step S65). The currently designated scope is displayed on the display screen after updating as indicated by hatching in FIG. 5, while the dimension of designated scope is contained within the dimension of permissible scope (steps S65, S66).

The loop processing from step S63 to step S66 as shown in FIG. 6 is executed, every time the operator depresses the movement key, so that the designated scope is expanded. If the designated scope exceeds $1=6$ column or $m=5$ line, it is detected that the designated scope has exceeded the permissible scope by the determination processing at step S65.

The CPU 10 causes the user information program 6 to sound an error buzzer and display an error message on the display screen. Also, it sets the permission flag on (step S67). As a result, the operator can know of the excessive block expansion error. Note that the designated scope on the display screen is not updated, but remains the maximum permissible scope.

If the operator reduces the designated scope by the use of the movement key upon this warning display, the procedure advances to steps S63 to S66, so that the warning display disappears. Also, if the operator depresses a designation ending key in the display state of FIG. 5, the CPU 10 confirms the permission flag to be on, and stores in place the designated scope starting and ending positions into the work memory 20, after which the scope designation processing is ended (steps S68, S69). With this setting of scope information, graphic conversion processing is enabled.

With this control procedure, since when the designated scope exceeds the permissible scope, the permission flag is already off irrespective of the depression of the designation ending key, there is no instance where the CPU 10 accepts an instructing operation of the designation ending key at step S68, and the table data beyond the permissible scope is set by error. A print example is shown in FIG. 8.

In the above example, further, after termination of the scope designation, the editing program of FIG. 1 is initiated to replace unnecessary data within the scope with the necessary line data outside of the scope, thereby making it possible to obtain a graph in conformity with the operator's intent. To this end, it is only necessary that an operation for graphic realization to be performed after the scope designation is defined, and the procedure is transferred to the editing program until that operation is performed.

Further, there may be provided a feature that the entire block scope is shifted vertically and/or horizontally by changing the starting position $(1_O, m_O)$ after the termination of the scope designation, whereby the graph creation is enabled by changing only data, without changing the size of scope, upon returning to a scope designation screen during the display of graph, so that the graphic processing involving classifying a number of items can be easily performed. While in this embodiment the display is restricted within the permissible scope even if the scope designation is made beyond the permissible scope, it will be appreciated that the scope area may be displayed and updated corresponding to the designated scope, when the dimension of designated scope is to be informed to the operator.

[Embodiment 2]

In this embodiment, the permissible designation scope is displayed by the frame prior to the scope designation for graphic.

An instance in which the bar graph is designated in the graph type selection menu of FIG. 3 will be described below. After the graph type designation, the execution procedure of the CPU 10 transfers to the scope designation program 10. Referring now to be flowchart of FIG. 11, the scope designation processing will be described below.

The CPU 10 reads out a column restriction value 5 and a line restriction value 4 from the restriction data of FIG. 4 as the initial value for a selected bar graph, and displays a frame figure having the dimension of five columns and four lines as shown in FIG. 8, based on a block designation starting position $(1_O, m_O)$ predefined on the display screen (steps S111, S112).

If the movement direction and the movement amount are instructed by a block movement key of the input device 40, the CPU 10 moves only the display position without changing the dimension of the effective scope (steps S113, S114).

After such effective display scope is moved to the data position desired for graphic representation by the operator, the operator performs the scope designation in a column direction with a data scope designation key. For example, if the operator performs the data designation of C2 to C3 in FIG. 8, the CPU 10 displays a figure of the graphic designated scope as shown in FIG. 9 (as represented with slanting lines in FIG. 9), and informs the operator of the operator's designated scope. Also, the effective area is displayed and updated corresponding to the width of designated scope in the column direction (amounting to two columns in this embodiment), based on a table describing the permissible number of lines corresponding to the number of columns as shown in FIG. 10 (steps S115, S116).

This column information with the scope designated is temporarily stored in the work memory 30.

Next, if the operator performs the scope designation in a line direction with the data scope designation key, the CPU 10 displays a figure of designated scope, like the scope designation processing in the column direction as above described (steps S117, S118).

Subsequently, the CPU 10 performs the loop processing of steps S113 to S120 every time the operator instructs modification for the scope designation, thereby modifying the scope designated data in the work memory 30, as well as updating the display on the display screen. After the operator performs the scope designation, a comparison of inclusion between the designated scope by the operator and the effective scope of FIG. 10 is made, in which if a determination is made indicating that the designated scope exceeds the effective scope, a warning is issued by the CPU 10 (step S100).

If the data scope designation is ended, the operator depresses an end key to instruct the CPU 10 to perform graphic processing. The CPU 10, upon detecting the depression of the end key (step S119), ends this control procedure, and transfers the operation to a graphic figure creation program.

In this embodiment, the number of columns for graphic is first determined, and the number of lines corresponding to that number of columns is converted from the initial value, but it follows that the effective number of columns is displayed corresponding to the number of lines as determined, when the scope designation in the line direction is first conducted.

In this embodiment, the effective data scope and the actual data scope designated by the operator are displayed concurrently. In this case, an operation for selecting either the effective data scope or the actual data scope when a key operation for graphic is entered is provided to enable the operator to select freely either scope. Thereby, it is possible to obtain a local graph designated by the operator, or a larger graph provided by the graphic feature, so that representation capability for the document is enhanced by using either graph to one's will.

For the instruction of movement or display for the effective scope in this embodiment, a cursor movement key (←,→,↑,↓), a TAB key or back space key may be used. Also, when there is an instruction for movement of the effective scope after designation of the actual scope, the movement of the actual scope display may be followed.

When the graph type is modified after the scope designation, the following processing should be performed. That is, when the scope designation is ended, the operator moves the cursor to an item at the starting position ($l_o$, $m_o$), and initiates the graph selection function again to change the graph type. The CPU 10 displays the effective data scope corresponding to the graph type changed in accordance with a restriction table for the initial display of FIG. 4.

The designation processing of the graphic data scope is the same as the processing procedure in this embodiment. Thereby, the transformat ion into more appropriate graph type and the scope alteration for the formation of a new graph are facilitated.

While in this embodiment, for the initial display of the graphic effective scope, a combination of the number of columns "5" and the number of lines "4" is used, it will be appreciated that the maximum effective scope (in an example of FIG. 10, the number of columns "16", the number of lines "20") may be used for the initial display.

[Embodiment 3]

In this embodiment, when the scope is designated beyond the capability of display/printing device, the numerical data within the designated scope is made graphic in sequence from the top position. And residual data within the scope is collectively summed to make a graphic as one data.

Referring now to FIGS. 12 to 14, this processing will be described below. It is supposed herein that a listing table as shown in FIG. 2 is created, and the scope designation as shown in FIG. 12 is performed. If the graph selection is a bar graph, it is assumed that the display device 70 has the restriction as to the number of columns and the number of lines as shown in FIG. 10.

The CPU 10 counts the number of data in the table of FIG. 12 as the number of columns being equal to six. Hence, it detects the permissible number of lines to be within four from the reference data 8 in FIG. 10, but the number of lines amounting to six lines is designated in the listing table (steps S141, S142).

The CPU 10 issues a warning, and selects data corresponding to the permissible number of lines minus 1, in this case, the first line to the third line.

Since the data by the amount of residual one line can be displayed by virtue of display restriction, the CPU 10 unifies a summation of data in residual lines from the fourth line to the sixth line for each column into one line data (steps S143 to S145).

In this way, the contents with data of three lines unified as one line data are shown in the lower section of FIG. 12. The CPU 10 creates a graph on the work memory 30 for a new table data thus created, and displays as shown in FIG. 13.

The restriction table as to the number of columns and the number of lines as shown in FIG. 10 is an example of the reference data 8, wherein the number of characters in the column is determined depending on the resolution of the display or printing device in the horizontal/vertical direction and the resolution of printing device in the horizontal/vertical direction.

Summarizing the above embodiment, when the scope with 1 columns and m lines is designated as a graphic scope, and if the CPU 10 determines from the restriction table that up to n lines in the case of 1 columns are printable, i) If m≦n, all m lines are made graphic as the actual data.

ii) If m>n, up to n-1 lines is made the actual data, and the residual m-(n-1) lines are summed for each column to be reset into one line, and dealt with as the abbreviated form data of "others" as previously described.

That is, the actual n-1 lines and the abbreviated form data of one line together constitutes n lines for obtaining the figure of a desired graph. The figure of graph is applicable not only to the bar graph, but also to all types of graphs.

By initiating the editing program 1 to change the order of each line after termination of the scope designation in this embodiment, a desired line can be individually output even when the permissible scope is exceeded. To this end, it is only necessary that an operation of executing the graphic representation after the scope designation is defined to enable the processing as an editing screen with other block displays accompanied.

After termination of the scope designation, it is possible that the actual data portion and the abbreviated form data portion may be displayed separately by a specific key operation. For example, the abbreviated form data is only displayed in half-tone, or differently displayed. Thereby, the operator can confirm the array contrary to his intention prior to executing the graphic representation, whereby the re-editing is permitted without attempting any wasteful display/print, so that the same effect can be obtained.

By providing a key operation of effecting the movement of abbreviated form data display, after the separate display of the actual data portion and the abbreviated form data portion, the abbreviated form data can be changed without changing the order of each line, so that the same effects as in the above embodiment can be obtained.

[Embodiment 4]

While in the described embodiments the graphic object scope is designated by one block, this embodiment allows for the designation in the unit of one column and one line, whereby discontinuous or noncontinuous columns or lines can be designated, so that the number of columns and the number of lines to be designable can be known during the designating operation.

An instance in which the bar graph is designated in the graph type selection menu of FIG. 3 will be given below. After designation of the graph type, the execution procedure of the CPU 10 transfers to the scope designation program 2. Referring now to the flowchart of FIG. 19, the scope designation process will be described below.

The CPU 10 reads out the column restriction value 5 and the line restriction value 4 as to the graph type selected, the count value I for the column designated number and the count value J for the line designated number are initialized to "0", respectively (step S191).

Then, table data of graphic object and the frame for the input of column number are displayed on the display screen as shown in FIG. 15 (step S192). In this embodiment, the frames for the input of column are provided by the number equal to the restriction value as above.

Then, the column symbol of graphic object is accepted from the input device 40 (step S193).

The CPU 10 counts the designated column number every time the column number is input (step S194). When this designated column number is less than the permissible restriction value, the CPU 10 displays the table data of the designated column, for example, in half-tone, in the display form indicating within the permissible restriction value, thereby informing the operator of the designated column data (step S196). Also, the designated column data is temporarily stored in the work memory 30 (step S197).

In this way, the CPU 10 performs repetitively the loop processing of steps S193 to S198 until the operator indicates the termination of input for the column data, thereby displaying and storing the column designated by the operator.

On the other hand, when the column designated number I exceeds the permissible restriction value, a message of impermissibility is displayed and a warning buzzer is issued (step S199). Next, the CPU 10 accepts an instruction for input end or doing over again (step S200).

In the case of input end, the column selection process is ended, and the operation transfers to the line designation process at step S202. In the case of doing over again, the operation returns back to step S191, to restart the above processing procedure and perform the column designation from the beginning again.

The line designation process is the same as the processing at steps S193 to S202, except that the column is replaced and read by the line, the detailed explanation thereof being omitted in this embodiment. For reference, an example of display when the column designation and the line designation are ended is shown in FIG. 16.

Thereafter, the CPU 10 extracts the column data (see FIG. 17) determined by the positional designation of designated column and line as the graphic data from the listing data, as is performed conventionally, and then this control procedure is terminated.

A graph created through the scope designation process of FIGS. 16 and 17 is output with an output result as shown in FIG. 18.

The following designation method may be used instead of the column designation method of this embodiment. That is, after selection of the graph type, the designated area with the column and line symbols as shown in FIG. 6 is displayed to enable the column and line designation with the following operation, instead of the input.

For example, after selection of the graph type, the first column C1 of an area displaying the column symbols "C1 to Cn" is reversely displayed, and when the designation of column C1 is determined, that column data is displayed in half-tone by depressing the determination key.

And the processing goes to C2. When the column designation is not made, the movement to an object column is made with a movement key (→,←, TAB key, back space key). Further, if the number of columns determined by a specific determination key exceeds the restriction column number "5" in accordance with the restriction table of FIG. 4, it is defined as an error which is informed to the operator with an alarm or message, as in this embodiment. And when a longitudinal movement key (↑,↓, screen-up scroll key, screen-down scroll key) is depressed, the column designation is ended, and the operation transfers to the line designation process. Like the column designation, the area displaying the line symbols (R1 to Rn) is reversely displayed, the movement to an object line is made with the longitudinal movement key, and the line designation is ended by the specific determination key.

In this embodiment, when the designation for the column and line for graphic is determined and the operator judge s the graph type to be inappropriate after the display of graph, a procedure of performing a key operation of returning to the scope designation screen of FIG. 16 again, initiating a graph selection program in the display screen of FIG. 16, and changing the graph type will be described below.

If the graph type after change is determined, the scope designation function allows the scope designation display already set to be changed in real time into the display of changed graph type in accordance with the restriction table of FIG. 4.

For example, the circular graph is changed to the bar graph, in which the circular graph has six columns and five lines designated, and is reversely displayed. The bar graph changed is reversely displayed successively from the smaller order of column number and line number, owing to the restriction to five columns and four lines. When there are some columns and lines outside of the scope in representing the bar graph changed, that area is displayed differently from the reverse display, for example, in mesh or half-tone, and is informed to the operator.

Further, a specific operation is provided to permit the changing and releasing of the designated column and the designated line.

With the above procedure, the scope of table data is determined, whereby the redesignation of desired columns or lines can be simplified for the operator, thereby eliminating wasteful operation.

The CPU 10 allows the effective column and line to be informed beforehand in reverse or half-tone display, beginning at a starting position of (column C1, line R1) and in the order of column C2, line R1, column C3, line R2, in accordance with the restriction table of FIG. 4, whereby the input area of the designated column and line of FIG. 15 is initialized in accordance with the display as previously provided. Also, it is displayed as the initial representation of the effective data to be supplied by the graphic feature. The operator may then perform a desired column designation with an instruction of deleting or moving the column being currently designated. In this case, the operator, if desiring to make the same designation as the designated column and line of the initial setting, may only perform the graphic operation, without the scope designation operation, whereby the operation can be further shortened.

Further, when the effective scope designation position displayed as the initial setting is changed, it is needless to say that the display for the designated scope may be changed correspondingly.

[Embodiment 5]

In the previous embodiment 3, data up to the restriction number-1 in the order of arrangement in the table are dealt as the actual data, and the residual are unified, whereas in this embodiment, data is rearranged in the greater order of data, and data up to the restriction number-1 are dealt as the actual data, particularly when data of one line or one column is made graphic.

An instance in which a circular graph is designated in the graph type selection menu of FIG. 3 will be given below. After designation of the graph type, the execution procedure of the CPU 10 transfers to the scope designation program 2. Referring now to a flowchart of FIG. 20, the scope designation process will be described below. First, the scope designation as shown in FIG. 21 is supposed.

In an example of FIG. 21, the number of items (columns) in the transverse direction of table data with the scope designation is equal to 6 columns. The CPU 10 counts the number of columns from table data for the scope designation to make a comparison between the predetermined permissible reference value "5" and the number of columns in scope designation "6" (steps S211 to S213).

Since the number of columns in scope designation is greater than the permissible number of columns, table data alteration necessary is determined by the CPU 10, based on this comparison determination. The CPU 10 first rearranges the table data in descending order as indicated by A in FIG. 22, based on this determination result (step S214).

Next, the columns directly used for the graph and the columns for unification are extracted. In this embodiment, when the number of columns m in designated scope ≦ number of permissible columns n, all m columns are used for the graph. Also, when m>n, data up to n-1 columns in greater order of data are used for the graph, and residual m-(n-1) columns are used for the graph as others. To this end, the CPU 10 calculates a summation of table data for m-(n-1) columns, its calculated result as indicated by B in FIG. 22 being unified into a column as the other abbreviated form table data (steps S215, S216).

As a result of this unification process, the number of columns in table data newly created automatically is equal to the permissible column number n ("5" in this embodiment).

Also, the CPU 10 calculates the occupancy ratio of circular graph in each column.

After such unification process, an example of circular graph output to the display/printing device is shown in FIG. 23.

An output example of the bar graph is shown in FIG. 24.

In this way, since the automatic modification is made so that the number of columns for table in designated scope may be contained within the permissible scope, the graphic figure to be output becomes readable.

Also, the columns for unification are selected in smaller order, so that the total statistical occupancy ratio expressed by the table data is not impaired.

In the above embodiment, the permissible value for use with the scope determination may be in common to the graph types, in which the selection process of graph type can be performed after the scope determination process.

In this embodiment, modified table data can be displayed. In this case, in the display of FIG. 21, the CPU 10 controls the display so that unmodified column data is displayed with mesh, and unified column data is displayed reversely. When the scope designation is made, the designated scope is displayed with mesh, and the column data for unification object are displayed reversely, so that the operator can recognize whether or not the modification is present.

With regard to the above aspect of the invention, after the actual data and the abbreviated data are displayed, a confirmation message for a graphic is displayed to prompt the operator to instruct the transfer to the graphic or the retry of scope designation. In this case, the CPU 10 determines the instruction of the operator, in which if the transfer to a graphic is instructed, the graph creation process is executed. Also, if the retry of scope designation is instructed, the execution procedure of the CPU 10 is transferred to the scope designation program 2.

Also, with the instruction of the operator, the CPU 10 causes the table data editing program 1 to be executed, and for the currently determined table data, the switching, movement, and deletion of the column data are performed to change the graphic representation.

It is needless to say that after editing of this table data, the CPU 10 causes the scope determination process to be executed again.

The scope designation of the display screen is performed by designating the starting and ending positions for the normal scope with the cursor, but as shown in FIG. 9, the designated scope display AA is moved to the display BB with the cursor movement key (←,→,↓,↑), the TAB key, or the back space key to enable the movement of designated scope, thereby facilitating the scope designation operation by the operator. In this case, every time the movement key is depressed, the CPU 10 updates the predesignated scope starting position and ending position, as well as changing the display position.

As above described, according to the present invention, even if the operator creates or designates column data beyond the permissible scope as the tabular data for a graphic, that column data is automatically modified to the readable table data. Therefore, the operator does not have to make modification operation of the table data.

Also, in the table data automatically modified, small value data are unified, so that the content for graphic representation is not greatly impaired.

Although the present invention has been described in its preferred forms with a certain degree of particularity, many apparently widely different embodiments of the invention can be made without departing from the spirit and the scope thereof. It is to be understood that the invention is not limited to the specific embodiments thereof except as defined in the appended claims.

What is claimed is:

1. A graph drawing apparatus comprising:

first storage means for storing a table containing a plurality of cells;

display control means for displaying the table stored in said first storage means;

designating means for designating a block of cells in the table displayed by said display control means;

count means for counting a number of cells in at least one of a column and a line in the block designated by said designating means;

second storage means for storing an upper limit of the number of cells in at least one of the column and the line suitable for drawing a graph corresponding to numerical data in the cells;

discriminating means for discriminating whether the number of cells in at least one of the column and the line counted by said count means is greater than the upper limit stored in said second storage means;

graph drawing means for drawing a graph based on the numerical data in the block designated by said designating means; and control means for controlling said graph drawing means to draw a graph when the number of cells counted is discriminated not to be greater than the upper limit by said discriminating means, and inhibiting said graph drawing means from drawing a graph when the number of cells counted is discriminated to be greater than the upper limit by said discriminating means.

2. A graph drawing apparatus according to claim 1, further comprising warning means for warning an operator when said discriminating means discriminates that the number of cells counted is greater than the upper limit.

3. A graph drawing apparatus according to claim 1, further comprising second display control means for distinguishably displaying on the table a block in which a number of cells is equal to the upper limit, based on the upper limit stored in said second storage means.

4. A graph drawing apparatus according to claim 1, wherein said designating means designates the block column by column and line by line.

5. A graph drawing apparatus according to claim 4, further comprising second display control means for displaying a residual number of lines and columns with respect to the upper limit stored in said second storage means in response to sequential designation operation of each line or each column by said designating means.

6. A graph drawing apparatus comprising:

first storage means for storing a table containing a plurality of cells;

display control means for displaying the table stored in said first storage means;

designating means for designating a block of cells in the table displayed by said display control means;

count means for counting a number of cells in at least one of a column and a line in the block designated by said designating means;

second storage means for storing an upper limit of the number of cells in at least one of the column and the line suitable for drawing a graph corresponding to numerical data in the cells;

discriminating means for discriminating whether the number of cells in at least one of the column and the line counted by said count means is greater than the upper limit stored in said second storage means;

graph drawing means for drawing a graph based on the numerical data in the block designated by said designating means;

first control means for controlling said graph drawing means to draw a graph when the number of cells counted is discriminated not to be greater than the upper limit by said discriminating means;

summation means for summing up numerical data in a predetermined number of cells lying in the block designated by said designating means into one datum, when the number of cells counted is discriminated to be greater than the upper limit by said discriminating means; and second control means for controlling said graph drawing means to draw a graph based on the data summed up by said summation means and data in the cells in the cells other than the cells containing summed-up data lying in the block designated by said designating means.

7. A graph drawing apparatus according to claim 6, further comprising second display control means for distinguishably displaying on the table the block designated by said designating means and a block in which data is to be summed up by said summation means.

8. A graph drawing apparatus comprising:

first storage means for storing a table containing a plurality of cells;

display control means for displaying the table stored in said first storage means;

designating means for designating a block of cells in the table displayed by said display control means;

count means for counting a number of cells in at least one of a column and a line in the block designated by said designating means;

second storage means for storing an upper limit of the number of cells in at least one of the column and the line suitable for drawing a graph corresponding to numerical data in the cells;

comparison means for comparing the number of cells in at least one of the column and the line counted by said count means with the upper limit stored in said second storage means;

graph drawing means for drawing a graph based on the numerical data in the block designated by said designating means;

first control means for controlling said graph drawing means to draw a graph when the number of cells counted is not greater than the upper limit as a result of said comparison means;

summation means for summing up numerical data in upper limit among data in the block designated by said designating means in smaller order into one datum, when the number of cells counted is greater than the upper limit as a result of comparison with said comparison means; and second control means for controlling said graph drawing means to draw a graph based on the data summed up by said summation means and data in the cells other than the cells containing summed up data in the block designated by said designating means, instead of all the data in the block designated.

9. A graph drawing method comprising the steps of:

storing a table containing a plurality of cells;

displaying the table stored in said storing step;

designating a block of cells in the table displayed in said displaying step;

counting a number of cells in at least one of a column and a line in the block designated in said designating step;

discriminating whether the number of cells in at least one of the column and the line counted in said count step is greater than an upper limit of the number of cells in at least one of the column and the line suitable for drawing a graph corresponding to numerical data in the cells;

drawing a graph based on the numerical data in the block designated in said designating step, when the number of cells counted is discriminated not to be greater than the upper limit in said discriminating step; and inhibiting drawing of a graph based on the numerical data in the block designated in said designating step, when the number of cells counted is discriminated to be greater than the upper limit in said discriminating step.

10. A graph drawing method according to claim 9, further comprising the steps of:

summing up numerical data in a predetermined number of cells lying in the block designated in said designating step into one datum, when the number of cells counted is discriminated to be greater than the upper limit in said discriminating step; and drawing a graph based on the data summed up in said summing up step and data in the cells other than the cells containing summed-up data in the block designated in said designating step.

* * * * *

UNITED STATES PATENT AND TRADEMARK OFFICE
CERTIFICATE OF CORRECTION

PATENT NO. : 5,557,716
DATED : September 17, 1996
INVENTORS    HIROTSUGU OKA ET AL.

Page 1 of 3

It is certified that error appears in the above-identified patent and that said Letters Patent is hereby corrected as shown below:

ON TITLE PAGE

AT [30]   Foreign Application Priority Data

"40175556" should read --4-175556--.

SHEET 6 OF 24

"SCOPE<MAXIMUM" should read --SCOPE>MAXIMUM--.

COLUMN 1

Line 17,   "if" should read --of--;
Line 19,   "graph" should read --graph,--;
Line 22,   "repetitively attempted the" should be deleted and "error of" should read --error,--;
Line 29,   "of" (first occurrence) should read --or--;
Line 31,   "when designating the graphic scope in" should read --for-- and "table" should read --tabular--;
Line 33,   "an" should read --and--.

COLUMN 2

Line 55,   "embodiment" should read --embodiments--;
Line 57,   "forms" should read --form--.

UNITED STATES PATENT AND TRADEMARK OFFICE
CERTIFICATE OF CORRECTION

PATENT NO. : 5,557,716

DATED : September 17, 1996

INVENTORS : HIROTSUGU OKA ET AL.

It is certified that error appears in the above-identified patent and that said Letters Patent is hereby corrected as shown below:

COLUMN 3

```
Line 5,   "FIG." should be deleted;
Line 6,   "4" should read --FIG. 4--;
Line 26,  "graphic object" should read --a graphic
          object--;
Line 62,  "tabular" should read --table (tabular)--.
```

COLUMN 4

```
Line 36,  "a company" should read --A company--;
Line 47,  "number" should read --numbers--;
Line 48,  "the" should be deleted;
Line 58,  "(due. e.g." should read --due, e.g.,--.
```

COLUMN 5

```
Line 10,  "de signation" should read --designation--.
```

COLUMN 6

```
Line 52,  "program 10." should read --program 2.--;
Line 53,  "be" should read --the--.
```

COLUMN 7

```
Line 29,  "S100)." should read --S67).--.
```

UNITED STATES PATENT AND TRADEMARK OFFICE
CERTIFICATE OF CORRECTION

PATENT NO. : 5,557,716

DATED : September 17, 1996

INVENTORS : HIROTSUGU OKA ET AL.

It is certified that error appears in the above-identified patent and that said Letters Patent is hereby corrected as shown below:

COLUMN 8

Line 3,   "transformat ion" should read --transformation--;
   Line 60, "constitutes" should read --constitute--.

COLUMN 9

Line 22, "noncontinuous" should read --noncontiguous--;
   Line 24, "designable" should read --designatable--.

COLUMN 10

Line 14, "instread" should read --instead--;
   Line 42, "judge s" should read --judges--.

Signed and Sealed this

Fifteenth Day of April, 1997

Attest:

BRUCE LEHMAN

*Attesting Officer*      *Commissioner of Patents and Trademarks*